United States Patent
Margetts et al.

(10) Patent No.: US 11,029,859 B2
(45) Date of Patent: Jun. 8, 2021

(54) CREDIT BASED COMMAND SCHEDULING

(71) Applicant: Toshiba Memory Corporation, Tokyo (JP)

(72) Inventors: Julien Margetts, Thame (GB); Hyoun Kwon Jeong, Pleasanton, CA (US); Jonghyeon Kim, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 230 days.

(21) Appl. No.: 15/684,076

(22) Filed: Aug. 23, 2017

(65) Prior Publication Data

US 2019/0065086 A1 Feb. 28, 2019

(51) Int. Cl.
*G06F 3/06* (2006.01)
*G06F 13/16* (2006.01)
*G06F 13/20* (2006.01)
*G06F 13/40* (2006.01)
*G06F 1/329* (2019.01)
(Continued)

(52) U.S. Cl.
CPC ............ *G06F 3/0625* (2013.01); *G06F 1/329* (2013.01); *G06F 1/3225* (2013.01); *G06F 1/3275* (2013.01); *G06F 3/0659* (2013.01); *G06F 3/0688* (2013.01); *G06F 13/1668* (2013.01); *G06F 13/20* (2013.01); *G06F 13/4068* (2013.01)

(58) Field of Classification Search
None
See application file for complete search history.

(56) References Cited

U.S. PATENT DOCUMENTS 9,727,267 B1 * 8/2017 Sebastian .............. G06F 3/0625
9,743,447 B2 * 8/2017 Kim .................. H04W 28/0215
(Continued)

OTHER PUBLICATIONS

Krzyanowski, Paul. Process Scheduling. CS 416 Operating Systems Design [online], Feb. 2015 [retrieved on Apr. 11, 2020]. Retrieved from the Internet:< URL: https://www.cs.rutgers.edu/~pxk/416/notes/07-scheduling.html>. (Year: 2015).*
(Continued)

*Primary Examiner* — Edward J Dudek, Jr.
*Assistant Examiner* — Ralph A Verderamo, III
(74) *Attorney, Agent, or Firm* — White & Case LLP

(57) ABSTRACT

A memory system includes a memory controller having a bank command scheduler implemented in a hardware logic block and a power budget controller including a power budget register and a credit register. The hardware logic block is able to determine a command in a queue to be transmitted to a memory bank over a channel, estimate a power consumption value for the command, and query the power budget controller to determine if the power consumption value is within a threshold. If the power consumption value is within the threshold, the hardware logic block receives a grant response from the power budget controller, adds the power consumption value to the credit register value, transmits the command over the channel, and transmits a signal to the power budget controller indicating that the command has been executed and that the power consumption value should be subtracted from the credit register value.

21 Claims, 11 Drawing Sheets

(51) Int. Cl.
    *G06F 1/3234*     (2019.01)
    *G06F 1/3225*     (2019.01)

(56)           References Cited

U.S. PATENT DOCUMENTS

| | | | |
|---|---|---|---|
| 2001/0056515 A1* | 12/2001 | Jacobs | G06F 13/364 |
| | | | 710/240 |
| 2004/0123172 A1* | 6/2004 | Sheller | G06F 1/3203 |
| | | | 713/323 |
| 2008/0295105 A1* | 11/2008 | Ozer | G06F 9/5011 |
| | | | 718/103 |
| 2011/0058440 A1 | 3/2011 | Smith et al. | |
| 2012/0203986 A1 | 8/2012 | Strasser et al. | |
| 2014/0253189 A1* | 9/2014 | Sadowski | G06F 1/32 |
| | | | 327/141 |
| 2016/0358305 A1* | 12/2016 | Banerjee | G06T 1/20 |
| 2017/0084344 A1 | 3/2017 | Choi et al. | |
| 2017/0163543 A1* | 6/2017 | Wang | H04L 47/215 |
| 2017/0192722 A1 | 7/2017 | Erez | |

OTHER PUBLICATIONS

Extended European Search Report dated Dec. 18, 2018.
Kang Seok Seo., "Method of Scheduling Request to Banks in a Flash Controller", U.S. Appl. No. 15/434,916, filed Feb. 16, 2017.

* cited by examiner

CREDIT BASED COMMAND SCHEDULING

FIELD OF THE INVENTION

The present invention generally relates to systems and methods to schedule transmission of commands over multiple channels and banks of memory devices in a memory system within a power budget.

BACKGROUND OF THE INVENTION

A solid state drive (SSD) includes a memory controller connected to a plurality of NAND flash memory devices organized into multiple channels with banks of dies which process commands and operations. SSDs include a scheduler which determines an order in which commands, including read, write, and erase commands, should be issued across multiple channels to multiple banks running in parallel at a given time. The parallelism across the SSD allows enables high performance of the SSD. The total power consumed across all dies at a given time may exceed the maximum power capability of the power supply of the SSD. Traditionally, power throttling measures in SSDs have been implemented with software, for example by managing the power consumption by limiting the total number of outstanding NAND flash memory operations in a queue. A power consumption estimate would be determined by the software by totaling an average power consumption of each operation transmitted by the scheduler. Traditional software based power throttling methods are insufficient to efficiently manage a power budget for modern SSDs since the timing of the hardware scheduling of commands is not closely related to software operations.

Software throttling as traditionally applied to SSDs features a conservative approach that significantly degrades performance. Software power throttling is not conducted in real-time, and instead relies on the command issue timing and report timing as received at the software, so the software is not able to know exactly when the NAND flash memory operation began or ended. There may be considerable gaps between the software detected timings and the timing of the real operation.

Software used in power throttling also suffers from a lack of information about the destination bank of commands and the history of commands approved by the software. The software may approve multiple commands within a power consumption budget, but in some cases all of the approved commands are transmitted serially over a single channel, inefficiently utilizing the resources of the SSD and the power budget.

Further, in traditional software-based power throttling systems, the estimated power consumption of a command does not include a level of granularity required for efficient use of the SSD resources. For example, there is no consideration given to I/O switching power consumption in traditional software-based power throttling systems. In modern systems this can lead to severe underestimations of the power consumption for a given command, as the contribution of power consumption from I/O switching increases with the higher I/O speeds of modern devices.

Finally, the current dissipation model of a NAND operation within the software power throttling traditionally includes a simple average of static values, and does not account for variations in dissipation during the use of the SSD.

Accordingly, there is a long-felt need to correct the problems inherent to present day systems.

BRIEF DESCRIPTION OF THE INVENTION

In an aspect, a memory system includes a memory controller having both a bank command scheduler implemented in a hardware logic block and a power budget controller including a budget register and a credit register. The memory controller also includes a memory bank having an I/O bus, and a channel connecting the I/O bus to the memory controller. The channel is configured to transmit data between the memory bank and the memory controller and to transmit a command from the memory controller to the memory bank. The hardware logic block determines a first command in a queue to be transmitted to the memory bank, estimates a first power consumption value for the first command, and queries the power budget controller to determine if the first power consumption value satisfies a threshold. If the first power consumption value satisfies the threshold, the hardware logic block transmits the first command to the memory bank over the channel and transmits a signal to the power budget controller indicating that the first command has been executed.

In another aspect, a method of transmitting commands based on a power consumption budget includes selecting, by a hardware logic block, a first command to send to a NAND bank over a channel, selecting a first phase of the first command, estimating a first power consumption value of the first phase, and comparing, at a power budget controller, the estimated first power consumption value to a difference between a value of a present power credit register and a vale of a power budget register. If the estimated first power consumption value is less than the difference, the method includes adding the estimated first power consumption value to the value of the present power credit register, transmitting the first phase of the first command to the NAND bank over the channel, and subtracting, after the first phase of the first command has been executed, the estimated first power consumption value of the present power credit register.

DETAILED DESCRIPTION OF THE INVENTION

Figure 1:
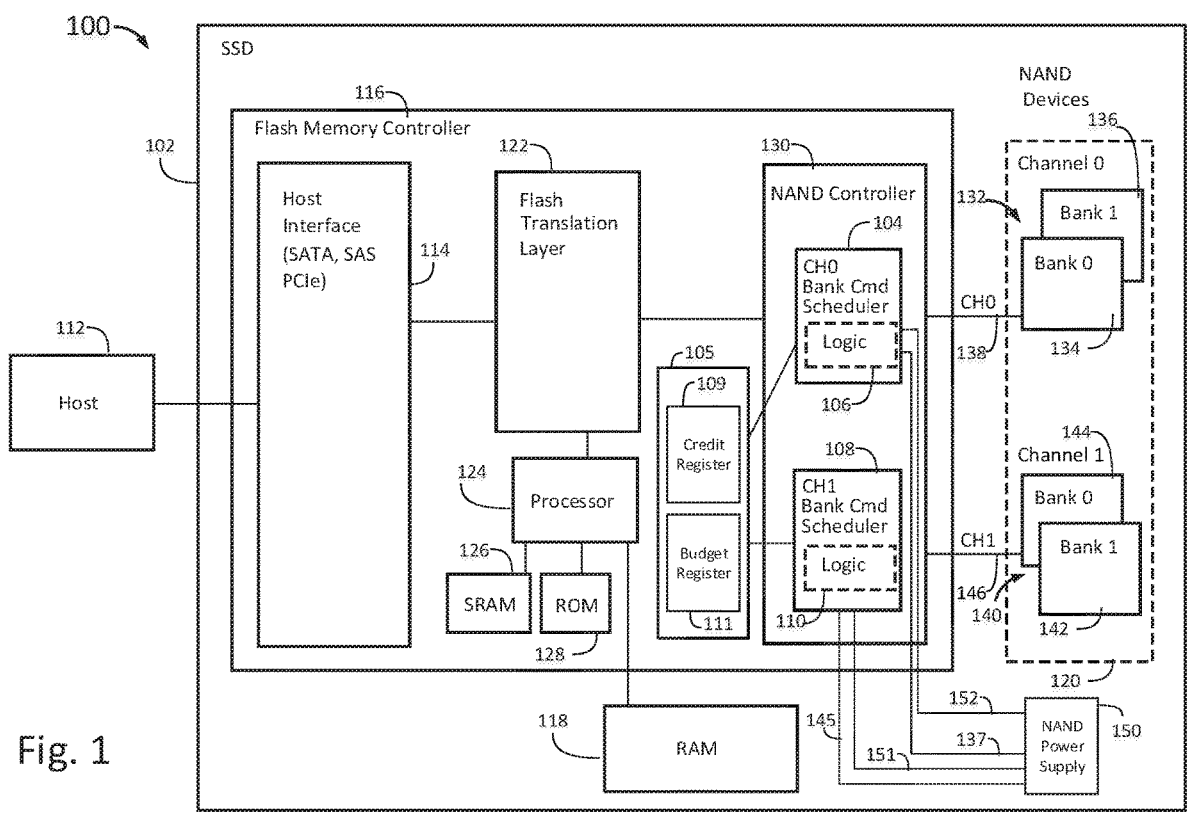
FIG. 1 shows a block diagram of an SSD including a power budget controller, and a power credit manager instantiated in decision logic, according to an embodiment.

FIG. 1 shows a block diagram 100 that schematically illustrates the structure of a solid-state drive (SSD) 102, in accordance with an embodiment of the present invention. The SSD 102 communicatively couples to a host device 112.

The host device 112 connects to the SSD 102 via a communication interface 114 conforming to a storage interface standard. The SSD 102 functions as an external mass storage device of the host device 112. Standards such as SATA (Serial Advanced Technology Attachment), SAS (Serial Attached SCSI), PCIe (Peripheral Components Interconnect Express) are examples of the communication interface standard between the SSD 102 and the host device 112.

The SSD 102 includes a flash memory controller 116, a random access memory (RAM) 118, NAND power supply 150, and NAND memory devices 120. The flash memory controller 116 includes a communication interface 114, a flash translation layer (FTL) 122, a processor 124, a static random access memory (SRAM) 126, a read-only memory (ROM) 128, a NAND memory controller 130, and a power budget controller 105. The NAND memory controller 130 includes a first bank scheduler 104 having first decision logic 106 and a second bank scheduler 108 having second decision logic 110. The power budget controller 105 includes a credit register 109 and a budget register 111. The power budget controller 105 is in communication with the first bank scheduler 104 and second bank scheduler 108 in the NAND memory controller 130 by hardware logic.

The NAND memory devices 120 includes one or more devices, each device composed of multiple banks of die coupled to the NAND memory controller 130 by a multi-signal data and control channel. The NAND memory devices 120 of FIG. 1 include a first NAND memory device group 132 having a first bank (Bank1 0) 134 and a second bank (Bank1 1) 136 coupled to the first bank scheduler 104 by a first channel (CH0) 138, and a second NAND memory device group 140 having a first bank (Bank2 0) 142 and second bank (Bank2 1) 144 of devices or dies, which are coupled to the second bank scheduler 108 by second channel (CH1) 146. First power rail 137 and second power rail 145 provide power from the NAND power supply 150 to the first bank command scheduler 104, and the second bank command scheduler 108, respectively. The power consumption of a command sent over the first channel (CH0) 138 can be measured at power rail 137 using first sensing link 151 connecting NAND power supply 150 to first bank command scheduler 104, and at power rail 145 using second sensing link 152 connecting NAND power supply 150 to second bank command scheduler 108. Each of the first bank command scheduler 104 and the second bank command scheduler 108 includes an associated power credit manager instantiated in the hardware logic, as will be discussed further below.

The NAND memory devices 120 are nonvolatile (non-transitory) NAND memory devices (e.g., first NAND memory device group 132 and second NAND memory device group 140) configured to store data read and written from and into the host device 112. The flash memory controller 116 performs (executes) data transfer control on the SSD 102. The RAM 118 temporarily stores data transferring between the host 112 and the NAND memory devices 120 by the flash memory controller 116. The RAM 118 functions as a data cache memory of the NAND memory devices 120, and may employ dynamic random access memory (DRAM), ferroelectric random access memory (FeRAM), magnetoresistive random access memory (MRAM), and the like.

The processor 124 in the flash memory controller 116 executes boot code in the ROM 128, transferring control to FTL firmware running in the SRAM 126 to manage the interchange of data between the host interface 114 and the NAND memory controller 130 via the RAM 118.

The flash memory controller 116 interfaces to the NAND memory devices 120 by one or more flash memory buses, called channels, comprising multiple data and control signals. For simplicity, FIG. 1 shows only two channels, the first channel (CH0) 138 and the second channel (CH1) 146, although there may be 8, 16, or more channels. On each channel, there may be multiple NAND memory devices (for example, first NAND memory device group 132 and second NAND memory device group 140) with multiple memory dies within each device. Dies or devices may be grouped together into units (i.e., banks) which are independently selectable using chip enable signals. For simplicity, FIG. 1 shows only two banks per channel, Bank 0 and Bank 1, although there may be 8, 16, or more banks per channel. Each channel has an associated power credit manager instantiated in hardware logic, discussed below, which determines a power consumed for each command transmitted over the channel, requests permission to transmit the command from the power budget controller 105, and reports the power consumed to the power budget controller 105 where it is recorded in the credit register 109.

The NAND memory controller 130 includes a bank scheduler (104, 108) corresponding to each of the channels, first channel (CH0) 138 and second channel (CH1) 146. First bank scheduler 104 controls the scheduling of memory commands issued to first bank (Bank1 0) 134 and second bank (Bank1 1) 136 on first channel (CH0) 138. Second bank scheduler 108 controls the scheduling of memory commands issued to first bank (Bank2 0) 142 and second bank (Bank2 1) 144 on second channel (CH1) 146.

First logic block 106 and second logic block 110 provide bit operation and support logic for bank selection within the first bank scheduler 104 and the second bank scheduler 108, respectively, in the NAND memory controller 130. The first logic block 106 and the second logic block 110 are hardware implemented logic blocks including logic gates and direct hardware inputs indicating statuses of the devices in the first NAND memory device group 132 and second NAND memory device group 140 and the first channel (CH0) 138 and the second channel (CH1) 146, as well as the inputs from the credit register 109, hardware register 111 and the comparison of the two registers. The logic blocks 106 and 110 enable the bank schedulers 104 and 108 to schedule commands being transmitted to the banks in the first NAND memory device group 132 and second NAND memory device group 140 to maintain a device power consumption below a set threshold.

First bank scheduler 104 and second bank scheduler 108, using first logic block 106 and second logic block 110, schedule the commands transmitted to the first bank (Bank1 0) 134 and second bank (Bank1 1). First bank scheduler 104, using first logic block 106 and associated power credit manager, determines a next command in the queue and requests permission from the power budget controller 105 to transmit the command and use a portion of the total power budget of the SSD device 102. The first bank scheduler 104 communicates with the power budget controller 105 to keep the total power consumption of the device within the power consumption budget. The average power consumption budget, for example measured as a fixed number of Joules per second (1 J/s=1 Watt), can be set by a user or manufacturer, determined at initiation of the device, or may be updated periodically depending on various factors including device temperature, power mode, and device usage. After a command is sent, the average power consumption budget value is stored in the budget register 111 of the power budget controller 105. Hardware implemented logic blocks within the first bank scheduler 104 and the second bank scheduler 108 allow the schedulers to transmit information to the power budget controller 105 and its credit register 109 and budget register 111 to determine if a next command in a queue is within the power consumption budget.

The transmission and execution of a command requires some amount of current over time. Commands such as read, write, and erase have different current profiles during the execution of the command. Because the current for each type of command varies over the course of completing the command, the first bank scheduler 104 uses the power credit manager instantiated in the first decision logic 106 to separate the command into one or more phases having an average current, and an associated average power over the period of execution. For example, a program command may be separated into a first I/O sensing power phase and a second cell program power phase. A read command may be separated into a first cell sensing power phase and a second I/O switching phase. An erase command has a single average current expended and is not generally separated into multiple phase.

The first decision logic 106, after determining if the command should be partitioned into one or more phases, determines the estimated power required for the execution of the command and requests permission to transmit the command and use the estimated power from the power budget controller 105. The estimation of the power may be determined by accessing a register or look-up table for an estimated current associated with a command type. The power budget controller 105 receives the estimation of the power for the command and determines if the present power budget can allow the execution of the command. This may be determined by comparing the estimated power of the command to a difference between the value of the budget register 111 containing the present power budget in Joules per second and the value of the credit register 109 containing an accounting of the amount of power being currently used by the execution of various programs and commands in the SSD. If the value of the credit register 109 is less than the present power budget value stored in the budget register 111 by an amount equal to or greater than the estimated power of the command, the power budget controller 105 will grant the first decision logic 106 permission to transmit the command for execution on the banks.

In some implementations, the power budget controller 105 keeps an additive tally of the power being currently used in the execution of commands in the credit register 109. The credit register 109 may have a value of zero when no commands are being executed, and the power consumption of each command transmitted for execution is added to the value of the credit register 109 as they are approved by the power budget controller 105. In order to determine if there is available power in the power budget, the power budget controller 105 subtracts the current value of the credit register 109, representing the total present power consumption of the device, from the value of the budget register 111. The difference between the value of the budget register 111 and the value of the credit register 109 is the power left in the power budget of the device available to execute additional commands. Alternatively, the credit register 109 may instead begin with the power consumption budget equal to the value of the budget register 111, from which present power usages by commands are subtracted, thereby recording the remaining power budget. In such an implementation, no comparison is required between the credit register 109 and the budget register 111, except to periodically ensure that the total power consumption budget is the same in each.

The budget register 111 and the credit register 109 are maintained and updated by the power budget controller 105. The budget register 111 includes a power consumption budget value, which may be set by the manufacturer or user, or may be dependent on the power state of the SSD device 102. The credit register 109 includes a continuously updated tally of the present power consumption of all commands being executed on the banks of the NAND memory devices 120. When a command is approved by the power budget controller 105, the estimated power of the command is added to the value of the credit register 109.

When the command has finished executing, and power is no longer being expended in the execution of the command, the first bank scheduler 104 sends a signal indicating that the command has been completed to the power budget controller 105, and the estimated power associated with the command is subtracted from the credit register 109 value. In this way, the credit register 109 value shows a present power usage of the SSD device 102. The more closely the credit register 109 value matches an actual present power usage of the SSD device 102, the more efficiently the SSD device 102 can function. If the estimation of the power required for a command is not correct, the power budget controller 105 may attempt to grant more commands than can be accommodated by the present power budget, or, on the other hand, may act too conservatively and not efficiently use the power resources of the SSD.

By dividing read and write (program) commands into phases having different current usages, the first bank command scheduler 104 more accurately estimates a current and power associated with the command at any time instant within the duration of a command, rather than assuming a constant average power consumption during the whole duration of the command. Further, the power budget controller 105 may determine that a certain phase of a first command which requires a large amount of current, for example a cell program phase of a program command, may be executed in parallel with a low power consumption phase second command, such as the NAND cell sensing phase of a read command, which was started at a different instant to the first command, where the phase of the second command corresponding to the same time instant of the I/O switching phase of the first command requires a relatively low current consumption and therefore in combination the first and second commands do not exceed the power budget at any time instant during the total period of the two commands. In other words, the power controller may recognize that the high and low power consumption phases of commands may be interleaved in a way that does not exceed the power budget. The interleaving may be performed in hardware by accurately timing the instants at which each command is transmitted, which is generally not possible in a software-based power throttling scheme. This allows the SSD device 102 to more efficiently use the available power resources and to more quickly transmit and execute commands as there may be more potential opportunities for commands to be transmitted and executed in parallel when command power consumption is divided into phases than when power consumption is based on a constant average consumption during the whole duration of a command. The interleaving of commands to efficiently utilize available power budget is further described below with regard to FIG. 8.

The instantiation of the power credit manager in the first decision logic 106, and the hardware based power budget controller 105, enable the credit register 109 value to be more quickly updated when a command is transmitted or finished. Keeping the credit register 109 value updated to accurately reflect the power being used at all phases of the execution of commands also enables the power budget controller 105 to determine whether there is sufficient power in the power budget to execute additional commands. Hardware-implemented logic blocks are able to quickly determine a power consumption estimate for a command by accessing a hardware register and efficiently handle a multitude of variables and conditions, thereby increasing the efficiency of command processing and scheduling while maintaining a device power consumption within the power consumption budget. An exemplary embodiment of the power credit manager per channel will be discussed below.

The estimation of the power usage associated with the various commands can be periodically updated to ensure that the power estimations are accurate. The actual power consumption of the commands can be determined upon initialization by a calibration procedure. The estimated power used by the commands can also be updated periodically by reconciling the actual power consumption of the transmitted commands with the estimations of the commands. The actual power consumption of commands sent over the first channel (CH0) 138 in a time period is measured at the power rail 137 by the first bank command scheduler 104 using first sensing link 151, and is measured at the power rail 145 by the second bank command scheduler 108 using the second sensing link 152. Similarly, the second power credit manager instantiated in the hardware logic of the second command scheduler 108 determines the actual power consumption of the commands sent over the second channel (CH1) 146 in the time period. The actual power consumption measured at the power rails 137 and 145 can be compared to the estimated powers of the commands transmitted over the channel and the estimations can be updated accordingly to better reflect the actual power expenditure associated with the execution of the commands.

Although each of the first bank command scheduler 104 and the second bank command scheduler 108 has its own power credit manager instantiated in the first decision logic 106 and second decision logic 110, the single power budget controller 105 receives and approves power budget requests from the first bank command scheduler 104 and the second bank command scheduler 108. The power budget controller 105 also arbitrates between the first bank command scheduler 104 and second bank command scheduler 108 in some instances.

For example, if the credit register 109 value is full, e.g., many commands have been approved and are currently being executed, there may not be enough of the power budget left to approve certain commands requiring large amounts of power. If the first bank scheduler 104 requests a power allowance from the power budget controller 105 for a large program command, the power budget controller 105 will not immediately grant the request because there is insufficient power in the power consumption budget, and the first bank scheduler waits for the grant indication to come from the power budget controller 105. So that the first bank scheduler 104 does not wait an indefinite amount of time for enough of the power budget to become free to transmit and execute the program, the power budget controller 105 can assign a priority to the program at the first bank scheduler 104. The assignment of priority to a command enables the power budget controller 105 to stop granting permissions for other commands until a sufficient amount of the power budget has become free for the larger priority command to be executed.

In some implementations, the power budget controller 105 assigns priority based on an age of the command. If a command cannot be immediately granted permission to be transmitted, the power budget controller 105 initiates a timer that tracks a time that the scheduler that submitted the command has waited for the command to be granted permission to be transmitted. When the timer reaches a set time threshold, indicating an 'age' of the waiting command, the command is granted a priority status, and the power budget controller 105 does not grant other commands until the power credit register 109 has sufficient power credit so that the priority command can be granted permission and is subsequently transmitted to the bank for execution. In some implementations, the power budget controller 105 assigns priority to a specific command type based on an input from a host. In some implementations, a priority is assigned at the bank command scheduler and commands of a certain type in the queue are prioritized over others.

In some implementations, a scheduling algorithm operates across the multiple flash channels to multiple banks of flash memory attached to each channel and accounts for the overall power budget in all of the flash memory devices attached to all of the channels. The scheduling algorithm may allow some types of operation to be scheduled in preference to other types of operation in accordance with keeping to a power budget. In some implementations, the age of pending queued commands are used in scheduling the commands in combination with the power cost profiles of the commands.

In some embodiments, the host 112 sets the power consumption budget for the NAND memory controller 130 as a method for monitoring and manipulating the thermal state of the SSD device 102. The power consumption value of a command can be associated with a rise in temperature of the SSD device determined, for example, from data in the manufacturing specification of the device. By monitoring the number of commands of each type which are transmitted and executed by the dies, and multiplying by a temperature increase for each command type, the NAND memory controller 130 may monitor the temperature of the device, and report the associated thermal state of the SSD device 102 to the host 112. The NAND memory controller 130 accounts for heat dissipation in the calculation of the thermal state by approximating a heat dissipation rate or by referring to a thermal sensor on the SSD. The host 112 and/or the NAND memory controller 130 can use the thermal state information to adjust the power consumption by restricting the power budget so that a lower number of commands are transmitted and executed to allow the heat to dissipate from the SSD device 102. Additionally, the host 112 and/or the NAND memory controller 130 may use the thermal state information to adjust a cooling of the SSD device 102, for example, by adjusting a fan speed.

Figure 2:
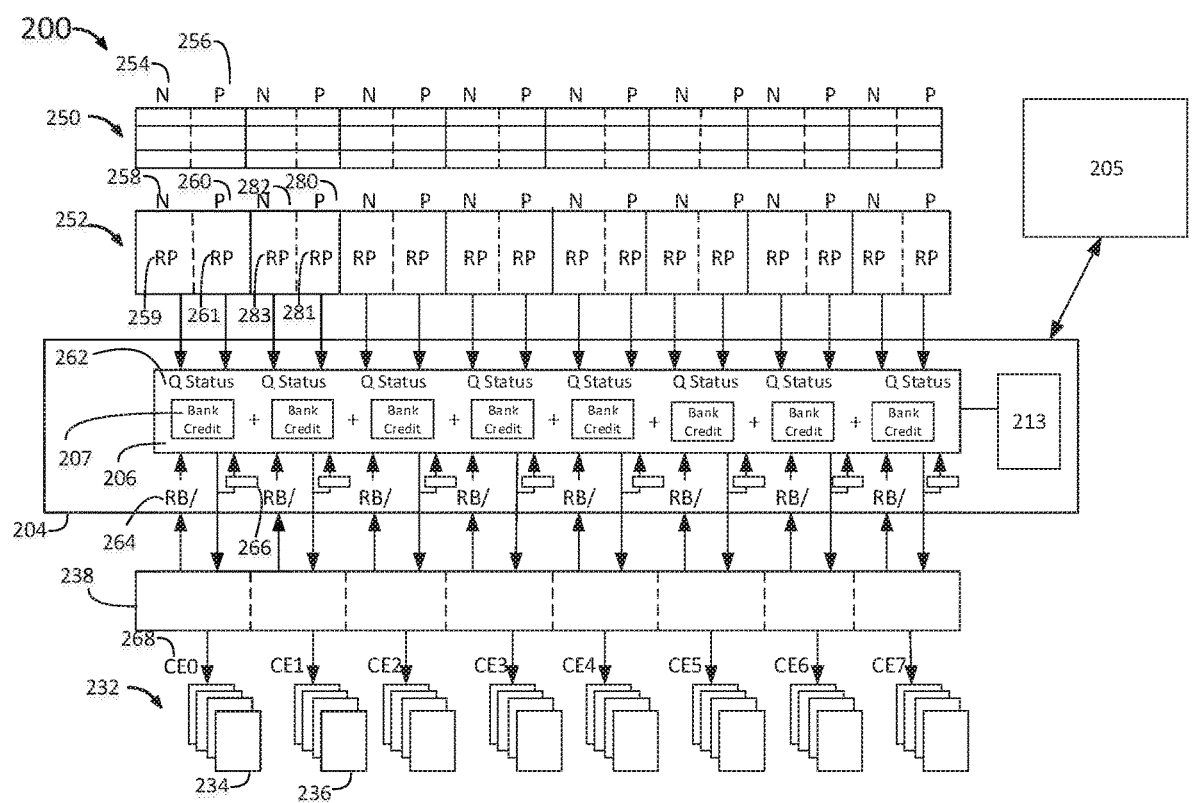
FIG. 2 shows a block diagram of a single channel's bank scheduler with decision logic, according to an embodiment.

A bank scheduler may schedule commands for transmission to the bank based on a variety of factors including the availability of a channel, the depth of a queue, the age of items in the queue, the type of command at the head of a queue, and the estimated power consumption of the command type. FIG. 2 shows a block diagram 200 of a single channel's bank scheduler 204 (e.g., corresponding to bank scheduler 104 or 108 described above) with decision logic, according to an embodiment. The block diagram 200 includes the bank scheduler 204 having a logic block 206. The bank scheduler 204 is coupled to the NAND memory devices 232 by a shared NAND bus channel interface 238. The block diagram 200 also includes a bank queue 250 divided into normal priority queues (e.g., normal queue 254 denoted by "N") and priority queues (e.g., priority queue 256 denoted by "P") for each of the banks of NAND memory devices 232. A head of each queue 252 including a head of the normal queue 258 and a head of the priority queue 260 are presented to the bank scheduler 204 into logic block 206 as a status of the queue 262. Also presented to the logic block 206 is a ready/busy signal 264 for each bank in the NAND memory devices 232, an estimated energy consumption associated with each command type 207 based on an estimation of energy consumption per command register 213, and a timer 266 which indicates a time remaining in execution of a command transmitted to a bank in the NAND memory devices 232. Further, the logic block 206 is in communication with power budget controller 205 in order to request and receive permissions to transmit commands within the power budget.

Although FIG. 2 shows a bank scheduler for a single channel, additional channels in an SSD device have a similarly structured bank scheduler also in communication with the central power budget controller 205.

The bank scheduler 204 including the logic block 206 accepts various inputs into the support logic instantiated in hardware, including the ready/busy signal 264, timer 266, status of the queue 262, and energy consumption value of a command 207 based on an estimated energy consumption per command type register 213. The bank queue 250 includes a plurality of command queues for the banks of the NAND memory devices 232 serviced by the bank scheduler 204. Each bank has an associated normal queue 254 and priority queue 256 which function as a list of commands from the host sorted into normal and priority commands. For example, in FIG. 2, eight banks of devices or flash memory dies are shown, including a first bank 234 and a second bank 236, and accordingly, 16 bank queues 250 are shown including eight normal priority queues (e.g., normal priority queue 254) and eight priority queues (e.g., priority queue 256). Whether a command is a normal command that should be entered in the normal priority queue 254 or a priority command to be entered into the priority queue 256 may be instructed by the host or may be based on the type of command. Each queue contains a list of commands to be transmitted to the associated bank of dies in the NAND memory devices 232 over the common NAND bus channel interface 238. The first command in each queue is in the head of the queue 252 where it is shown as a request packet (RP). The head of the normal priority queue 258 contains normal priority command 259. The head of priority queue 260 contains priority command 261. The request packet may be any appropriate NAND operation command, including read, write, erase, or other commands to be transmitted to one of the banks.

The logic block 206 determines the power consumption 207 or 'bank credit' required for a command at the head of the queue. The power consumption 207 is determined by calculation of the power consumption based on an estimated power consumption amount for the command type, as may be accessed at energy consumption per command register 213. The energy consumption per command register 213 stores an average value of current usage and energy consumption of each command type per second. The power consumption per command register 213 also stores current usages during different phases of each command type along with the timing of these phases within each cycle. The power consumption 207 of each command being executed on the NAND memory devices 232 may be determined both on average and at each phase of the command and tallied by the bank scheduler 204 to determine the total power consumption bank credit being used by the NAND memory devices 232 on the channel at any given time. The bank scheduler 204 is in communication with the power budget controller 205 in order to determine if a command having an associated power consumption is within the power budget and can be sent on the channel.

The logic block 206 determines the scheduling of the commands in the queues, determines an estimated power consumption of a next command to be transmitted 207, and requests a permission from the power budget controller 205 to transmit the command and use the estimated amount of the power budget.

The first command in each queue in the head of the queue 252 is available to the logic block 206 in the bank scheduler 204 as the status of the queue 262. The input of the commands in the head of each queue 252 is received by the logic block 206 as the status of the queue 262 and enables the logic block 206 to determine to which bank a next command should be scheduled over the NAND bus channel interface 238 in which order. The logic block 206 includes logic which gives preference to commands which are queued in the priority queues (e.g., head of priority queue 260). In some implementations, the logic block 206 includes logic that preferences all commands queued in the priority queues (e.g., priority command 261) before transmitting any normal priority commands (e.g., normal priority command 259). In such a situation, normal priority commands (e.g., normal priority command 259) are sent only when there are no commands queued in the priority queues. In some implementations, normal priority commands (e.g., normal priority command 259) and priority commands (e.g., priority command 261) are transmitted over the NAND bus channel interface 238 in a mixed order dependent on other inputs to the logic block 206.

The logic block 206 determines the operation command at the head of the priority queue 260 or at the head of the normal priority queue 258, determines if the command should be broken into phases, and determines an estimated energy consumption 207 of each of the phases of the command by accessing an energy consumption per command register 213. The estimated energy consumption 207 of the command at the head of the priority queue is transmitted to the power budget controller 205, where it can be compared to an available power within the power budget and the request can be granted if a sufficient amount of power is available in the power budget. In some implementations, the power budget controller 205 determines the timing of the scheduling of the command over the NAND bus channel interface 238 such that the estimated energy consumption of the command at each phase of the command when considered in conjunction with commands already scheduled and transmitted on the NAND bus channel interface 238 does not exceed the power available in the power budget. In some implementations the timing may be adjusted by the bank scheduler by advancing or delaying the scheduling of the command by an amount determined by the power budget controller 205.

In some implementations, when determining whether the command can be executed within the present power budget, the power budget controller 205 indicates the precise timing of the command to the bank scheduler in order that the phases of the command can be interleaved with the power timelines of other commands which are already proceeding in order that the peak current phases align with trough current phases of the preceding commands.

If there is insufficient power available in the power budget, the command may be labeled as a priority command and given preference as additional power becomes available in the power budget. In some implementations, the logic block 206 includes logic that suspends the processing of a normal priority command (e.g., normal priority command 259) on a bank in order to transmit and execute a priority command (e.g., priority command 261) that has been queued in a priority queue (e.g., priority queue 256 and head of priority queue 260) for the same bank after the normal priority command has been transmitted. For example, if the normal priority command 259 is an "Erase" command, and there is no priority command 261 in the head of the priority queue 260, the logic block 206 will transmit the "Erase" command to the first bank 234 over the common NAND bus channel interface 238 after receiving approval from the power budget controller 205. The logic block 206 sets the timer 266 for a predetermined time period, which may correspond to a period of time typically needed for execution of the "Erase" command. While the logic block 206 continues to schedule commands to other banks within the power budget, a priority command 261 such as a read request may be placed in the head of the priority queue 260 for the first bank 234. If the priority read request is granted permission for transmission and execution by the power budget controller 205, the logic block 206, can issue a "Suspend Erase" command to the first bank 234 for pausing execution of the "Erase" command even if the timer 266 associated with the "Erase" command executing on the first bank 234 has not yet expired. After the "Suspend Erase" command has been received and/or confirmed by the first bank 234, the anticipated energy consumption of the erase command can be credited back to the power budget. The logic block 206 then issues the priority "Read" command to the first bank 234. The "Read" command is then executed by the first bank 234. After the "Read" command has been executed, if there are no additional priority commands 261 in the priority queue 256, the logic block 206 or bank scheduler 204 may instruct the first bank 234 to "Resume" the suspended erase operation. The suspension of execution of a non-priority command in favor of a priority command is further described below with regard to FIG. 7.

In some implementations, if there is insufficient power in the power budget for a command, another bank scheduler can request and transmit a different command over a different channel, and the initial command may execute when there is sufficient power in the power budget.

A command that has been determined by the bank scheduler 204 to be transmitted next must be granted permission by the power budget controller 205 before it can be transmitted over the NAND bus channel interface 238 to the appropriate bank of devices or flash memory dies 232 as determined by the logic block 206. In some implementations, the command is broken into phases, when appropriate, and a power consumption value of the first phase is estimated from the power consumption per command type register 213 and sent to the power budget controller 205 for approval. After the request to use a portion of the power budget in the execution of the command has been approved, the command is transmitted to the bank. After sending the command to the selected device, the logic block 206 sets the timer 266 to a predetermined time period based on the command type (e.g., a read, write, erase, etc.), the predetermined time period corresponding with a period of time associated with the typical execution of the transmitted command type. When the timer 266 has expired for the execution of the transmitted command, the logic device 206 requests a status from the selected device on the first bank 234, and the selected device transmits a signal or suitable response to the logic block 206 for the particular command transmitted. Alternatively, the logic block 206 may determine the status of the operation from the ready/busy signal 264 of the selected device. By requesting the status from the selected device, the logic block 206 transmits a request for the status only when there is an appropriate amount of time in the schedule of commands to both request and receive the status. In some embodiments, the method by which the logic block 206 determines a status of the operation may be selectively configured in the supporting hardware.

After the command has been completed and the status of the operation has been transmitted to the logic block 206, the logic block communicates the status to the power budget controller 205 and the estimated power consumption of the command is credited back into the credit register, indicating that this amount of the power budget is now available for use by another command or program.

When a command is transmitted to one of the bank of devices 232 (e.g., to first bank 234) via the NAND bus channel interface 238, the logic block 206 determines whether a subsequent command should be transmitted and also determines to which of the banks the subsequent command should be transmitted to. The logic block 206 continuously has access to the updated inputs from the ready/busy signal 264, timer 266, and status of the queue 262 for each bank. A series of logic gates allows the logic block 206 to determine the schedule of the commands in order to efficiently distribute and execute the commands to each of the banks. The logic gates also allow the logic block 206 to maintain a consistency of execution of the scheduled commands. The logic block 206 determines the order in which banks will receive a command via the NAND bus channel interface 238, and through communication between the bank scheduler 204 and the power budget controller 205 determines if there is sufficient power in the power budget to execute the command.

Figure 3:
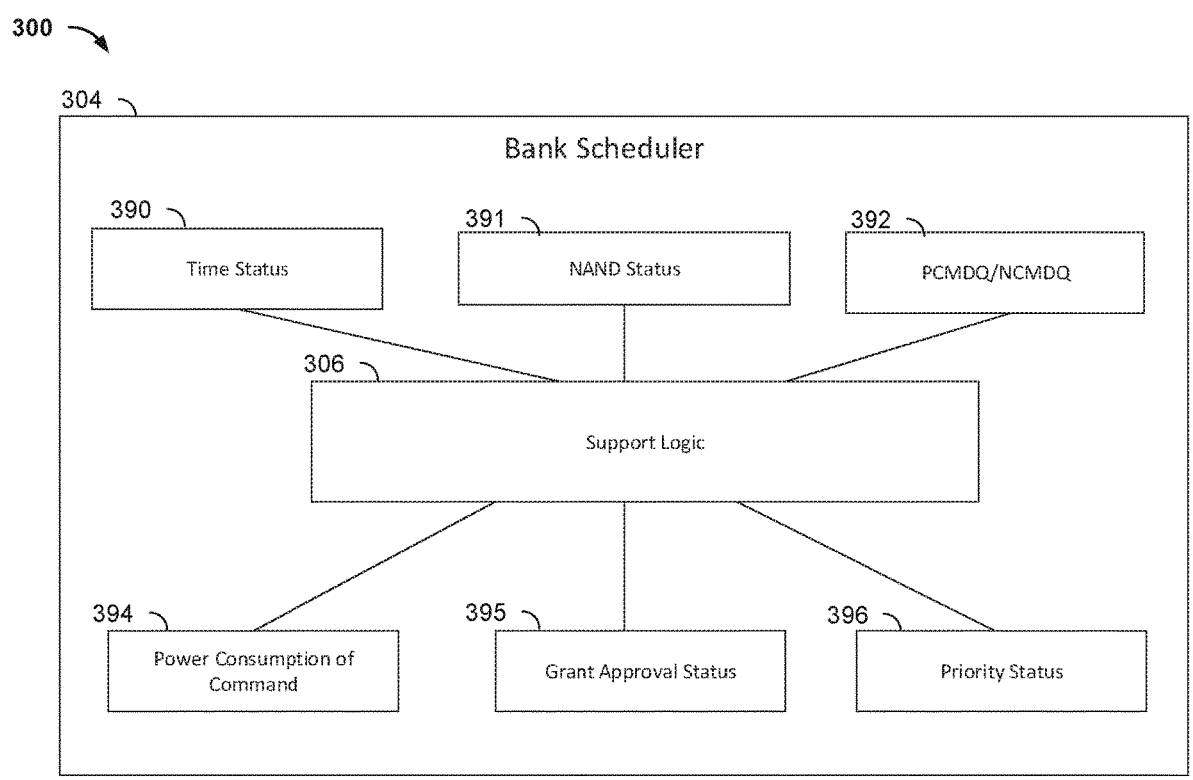
FIG. 3 shows a block diagram of inputs to the power credit manager for a channel, according to an embodiment.

For each command which is determined to be transmitted next by the logic block 206, the logic block 206 must request the estimated amount of power consumption from the power budget controller 205 necessary for the execution of the command. The inputs of the bank scheduler logic block, such as logic block 206, for determining and requesting a power credit amount from the power budget controller is illustrated in FIG. 3. FIG. 3 shows a block diagram 300 illustrating the direct inputs to the bank scheduler 304 to determine a power consumption of a command at a head of a queue and request a power credit for that amount from the power budget controller.

The bank scheduler 304 includes logic block 306, which comprises hardware-bases support logic forming the power credit manager for a cannel. The support logic uses various direct inputs to determine the scheduling of commands within the power consumption budget of the device.

The inputs to the logic block 306 include a power consumption of a command 394, grant approval status 395, priority status 396, timer status 390, NAND status 391, and priority and normal command queue status PCMDQ/NCMDQ 392.

The logic block 306 includes the power consumption of a command 394 as a direct input. As the logic block makes a determination about a next command in the queue to be executed from the priority and normal command queue status PCMDQ/NCMDQ 392, the logic block 306 determines the power consumption of the command 394, for example by accessing a register in which an average or estimated power consumption per command type is stored. The determined power consumption of the command 394 may then be provided by the bank scheduler 304 to a central power budget controller (such as power budget controller 105 in FIG. 1), where it is determined whether there is sufficient budget in the power consumption budget of the device to execute the command. The power budget controller can then provide an approval signal to the logic block 306, after which the bank scheduler 304 will transmit the command for execution. In some implementations, the determined energy consumption 394 of the command may be broken into phases and the central power budget controller may determine that there is sufficient budget in the power consumption budget if the command is scheduled at a certain time and therefore provides timing information to the logic block 306 in addition to an approval signal. Alternatively, if there is insufficient power in the device power budget for execution of the command, the power budget controller does not provide an approval signal, and may instead label the command a priority, such that when sufficient power budget is available the command will be executed before other non-priority commands.

For read and write commands, the estimation of the amount of energy consumption is improved by breaking the command into phases which correspond to different current usage during the execution of a command cycle. Traditionally, a current dissipation model of each NAND operation is a very simple average static current value for each operation, but this model fails to capture the details of variations during the timeline of the operations. In reality, the current model should take into account additional details of the NAND operation and device, for example by partitioning the command into several phases, or sub-operations, along the timeline.

To determine an estimated energy consumption of each NAND operation, a cost in Joules of the energy consumed from all power rails may be assigned to each flash operation, including program, read, and erase operations. Within one flash operation, different power profiles may exist based on different characteristics of the flash operations. For example, a read operation from an upper portion of a page can be assigned one cost profile, while a read operation from a middle portion of a page is assigned a second cost profile, and a read operation from a bottom of the page is assigned a third, different, cost profile. These estimations of energy consumption may be stored in a register and accessed by the logic block to calculate an estimated energy consumption of a particular command.

Figure 4:
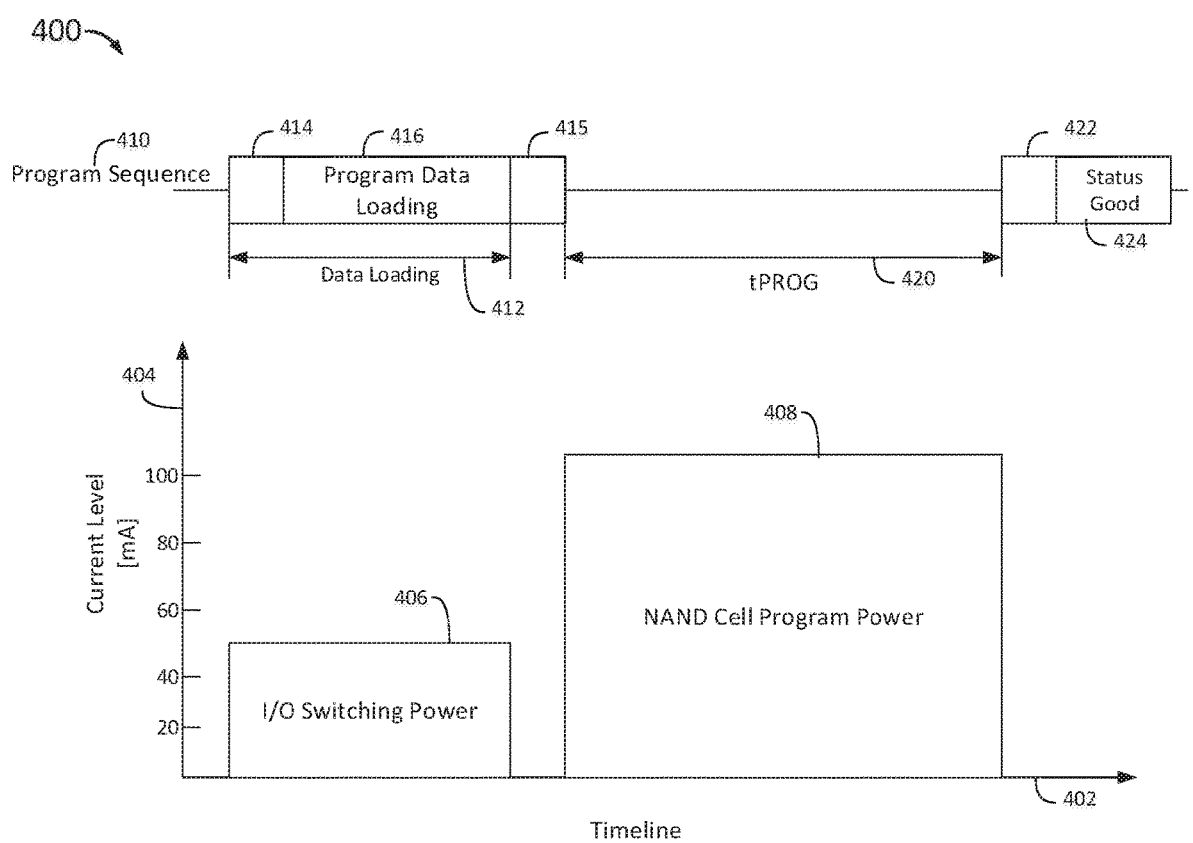
FIG. 4 shows a plot of a simple current modelling based on NAND flash memory operation phases for a write program.
Figure 5:
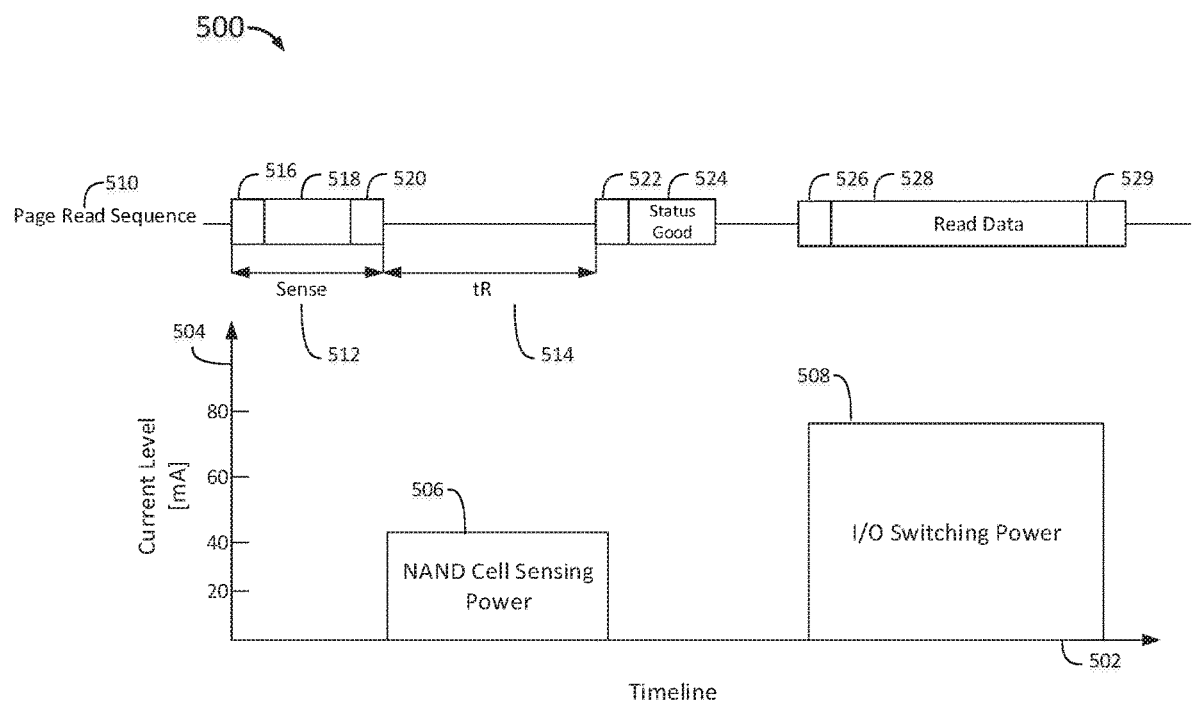
FIG. 5 shows a plot of a simple current modelling based on NAND flash memory operation phases for a read command.
Figure 6:
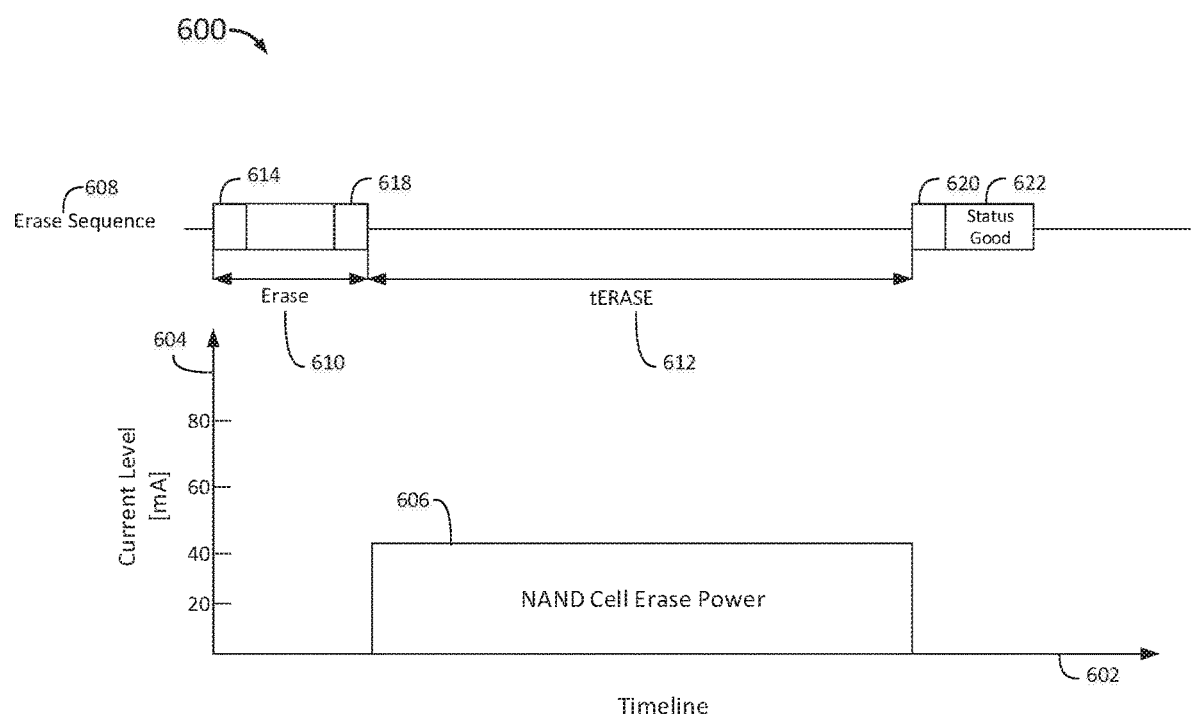
FIG. 6 shows a plot of a simple current modelling based on NAND flash memory operation phases for an erase command.

By breaking down NAND operations into sub-operations with an associated cost profile in terms of energy consumed a more accurate estimate of the energy consumption of the operation can be obtained. FIGS. 4-6 show plots of a simple current modeling based on the phases of operation of a NAND during the execution of various commands. The current modeling trims a current peak waveform such that each NAND operation phase has a single current level, enabling simple estimation of the current for each command. Each NAND operation command can be broken down into one or more phases, depending on the operation sequence and the current dissipation characteristics of the NAND. Breaking down the NAND operation into sub-operations, each sub-operation with its own cost profile, allows a more accurate estimate of the energy consumption to be determined.

FIG. 4 shows a plot 400 of a simple current modelling based on NAND operation phases for a write (program) command. The plot 400 includes an x-axis 402 representing a progression of the command in time and a y-axis 404 representing the current in mA. The current level of the program sequence is broken down into two phases, the data-in phase and the cell program phases. The plot 400 includes a first phase 406 representing the I/O switching power phase (the data-in phase) required as a first step of executing the write command. The plot further includes a second phase 408 representing the NAND cell program power phase (the cell program phase). Each of the I/O switching and the program phases can be modeled having a representative current level depending on how many planes are involved in the program sequence, or how fast the I/O speed is. The execution of the I/O switching occurs over a period of time and uses a simplified current for that period of time. The energy consumption value of the I/O switching phase is proportional to the current level expended multiplied by the time during which the phase is executed. The execution of the program requires a higher simplified current for a period of time after the I/O switching. The current level of the I/O switching phase may vary depending on the I/O speed. The energy consumption value of the program phase is similarly proportional to the current expended during the execution of the phase multiplied by the time over which the phase is executed.

A detailed current model may take into consideration different possible conditions for each NAND operation, including the NAND configuration, I/O speed, and the number of planes, as relevant to the NAND operation. For a program command, the controller stores, in a hardware register, information regarding the energy consumption period, current level modeling, and type. In order to determine the energy consumption value for a write (program) command, the controller first determines the energy consumed by the I/O switching. To determine the I/O switching energy, the controller accesses the hardware register and determines a current level based on the speed of the I/O switching by which the time of the NAND I/O data transfer command from beginning to end is multiplied to obtain the total energy consumed during the command phase. The second component of the write sequence is the cell program operation. The controller accesses the hardware register to determine the particular current level dependent on the number of planes and the position on the page that is multiplied by the time from the command issue to the status check returned as ready in order to calculate the NAND cell program energy associated with the write (program) command.

The program sequence 410 is illustrated over time in the timeline above the plot 400. The program sequence 410 includes a program data loading phase 416, in which the actual data loading 412 corresponds to the I/O switching power phase in the first phase 406 of the program operation. The program data loading sequence 416 begins at 414 and ends at 415. The power credit manager measures the current over this time from 414 to 415 in order to determine the actual energy consumption value of the I/O switching operation. The write program phase (tPROG) 420 occurs following the end of the program data loading 416 phase. After the write program 420 ends, at 422, a status indicator 424 is provided to indicate that the program is complete. The power credit manager measures the current used from the end of the program data loading phase 415 until the end of the tPROG phase 420 to determine the actual energy consumption value of the NAND cell program. In some implementations, the power credit manager calculates the actual energy consumption value by measuring the current consumption on the power rails during this time.

FIG. 5 shows a plot 500 of a simple current modelling based on NAND operation phases for a read command. The plot 500 includes an x-axis 502 representing a progression of the command in time and a y-axis 504 representing the current in mA. The current level of the read sequence is broken down into two phases, the cell-sensing phase and the data-out transfer phase. The plot 500 includes a first phase 506 representing the cell-sensing power phase required as a first step of executing the read command. The plot further includes a second phase 508 representing the I/O switching power phase (the data-out phase).

For a read command, the controller accesses the hardware register and determines that the energy consumption value must be calculated for both the sensing phase and the I/O switching phase of the command, that is, that the command should be split into components for an accurate estimation of the energy consumption of the command. Based on the estimation values stored in the hardware register, the controller calculates the energy consumed by the NAND cell sensing phase of the read operation by multiplying the time from the command issue to the status indicator returning that the NAND is ready by a current level based on the number of planes and the position on the page. The controller then calculates the I/O switching energy by multiplying the time from the NAND I/O data transfer commands beginning to end by a current level based on the speed of the I/O switching. The sum of the two phases of the read command is the total energy consumption value for the read operation. However, the energy consumption values of the phases are calculated separately and when the request to the power budget controller is submitted the power budget controller accesses information from hardware registers concerning the timing and energy consumption values of each phase of the command. The power budget controller can utilize this information to determine whether to grant or deny the command and to schedule the command if granted.

For the read command, the command sequence 510 is illustrated over time in the timeline above the plot 500. The command sequence 510 includes a sensing phase 518, in which the sense command 512 is sent prior to the NAND cell sensing. The sense command 512 begins at 516 and ends at 520. The execution of the transmitted sense command 512, including the read command details, occurs at tR 514 and corresponds to the NAND cell sensing power in the first phase 506 of the read operation. After the execution of the sense command 512 at tR 514, a status indicator is provided 524 beginning at 522. The power credit manager may measure the current of the cell sensing power operation 506 by measuring the current used from the end of the transmitted sense command 520 to the beginning of the transmitted indicator status 522. The read data phase 528 begins at 526 and ends at 529. The read data phase 528 corresponds to the I/O switching power phase in the second phase 508 of the read command operation. In order to measure the actual power consumed during this phase of the read command operation, the power credit manager measures the current from the beginning of the read data phase 526 to an end at 529. In some implementations, the power credit manager calculates the actual energy consumption value by measuring the current consumption on the power rails during this time.

FIG. 6 shows a plot 600 of a simple current modelling based on NAND operation phases for an erase command. The plot 600 includes an x-axis 602 representing a progression of the command in time and a y-axis 604 representing the current in mA. Unlike FIGS. 4 and 5, the erase command is not broken into multiple phases to estimate the energy consumption value of the command. In contrast to FIGS. 4 and 5 showing the read and write commands, the plot 600 includes only a single phase 606 representing the NAND cell erase energy consumed at a particular current over the time required to execute the erase command.

For an erase command the controller determines from the hardware register that only the erase operation phase must be included in the energy estimation. The controller calculates the energy consumed by the erase command by multiplying the time from the issuance of the command to the return of the status indicator that the command has been completed by a current level depending on the number of planes and the position on the page being read.

The plot further includes an illustration of the command sequence 608 for a block erase command executed by the NAND as transmitted over the channel to and from the controller. The erase command sequence 608 includes a transmitted erase command 610 which begins at 614 and ends at 618. After receipt of the erase command 610, the erase execution phase tERASE 612 begins. tERASE 612 corresponds to the NAND cell erase power phase 606. The tERASE phase 612 ends and a status indicator 622 is transmitted beginning at 620. A power credit manager calculates the actual energy consumption value of the erase command by measuring a current from the end of the transmitted erase command at 618 to the beginning of the status indicator 620. In some implementations, the power credit manager calculates the actual energy consumption value by measuring the current consumption on the power rails during this time.

Command energy modeling by splitting a command into phases of constant current usage allows the controller to better estimate the energy consumed by the execution of various commands so that the controller can determine the overall power being consumed by the storage device at any instant. Reconciling the estimated power consumption with the actual power consumption value allows the power budget to be better monitored and allows dynamic adjustment to the estimation values of each of the NAND command operations in order to efficiently use the power budget without performance degradation of the device.

Figure 7:
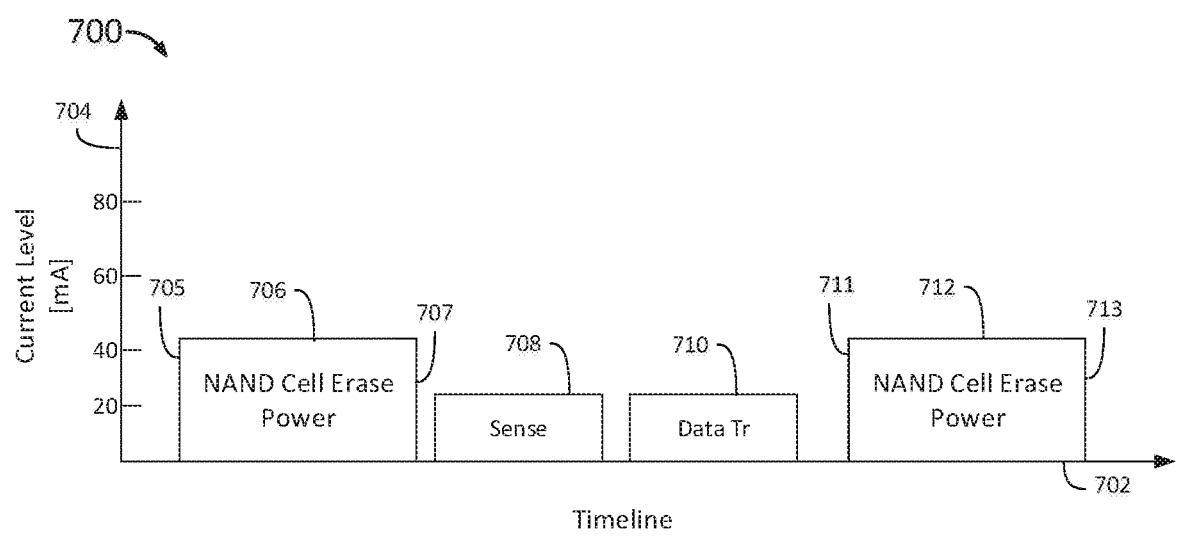
FIG. 7 shows a plot of a simple current modelling based on NAND flash memory operation phases for an erase command suspended for a read command.

FIG. 7 shows a plot 700 of a simple current modelling based on NAND operation phases illustrating the suspension of an erase command in favor of a priority read command. The plot 700 includes an x-axis 702 representing a progression of the command in time and a y-axis 704 representing the current in mA. The plot 700 includes a first phase of an erase command 706, a second phase of an erase command 712, a sensing phase of a read command 708, and a data transmission phase of a read command 710.

The first phase of the erase command 706 represents a power required to execute the first phase of the erase command 706. The execution of the erase command occurs over a period of time and uses a simplified current for that period of time. The energy consumption value of the first phase of the erase command 706 is proportional to the current level expended multiplied by the time during which the first phase 706 is executed. The first phase of the erase command 706 has a start 705 at which time execution of the erase command begins.

Typically, the erase command will continue until the erase has been completed. However, if there is a command which has priority status, the priority command may be given preference and the processing of a normal priority command, such as the erase command (first phase 706 and second phase 712 which would ordinarily be executed consecutively), may be suspended in favor of the priority command.

The erase command is suspended at 707 by the controller. The priority read command, including the sensing phase of a read command 708 and the data transmission phase of a read command 710, is then transmitted and executed. Following the execution of the priority read command, the erase command is resumed at 711, and the second phase of the erase command 712 is executed until the erase is completed at 713. The suspension of normal priority commands in order to execute priority commands allows the controller to quickly process commands which have priority and to efficiently use the available power budget.

Although FIGS. 4-7 show an x-axis depicting a timeline of a command and a y-axis showing a simplified current associated with the command, it should be noted that these axes are not to scale and may not be to the same scale amongst all figures.

Figure 8:
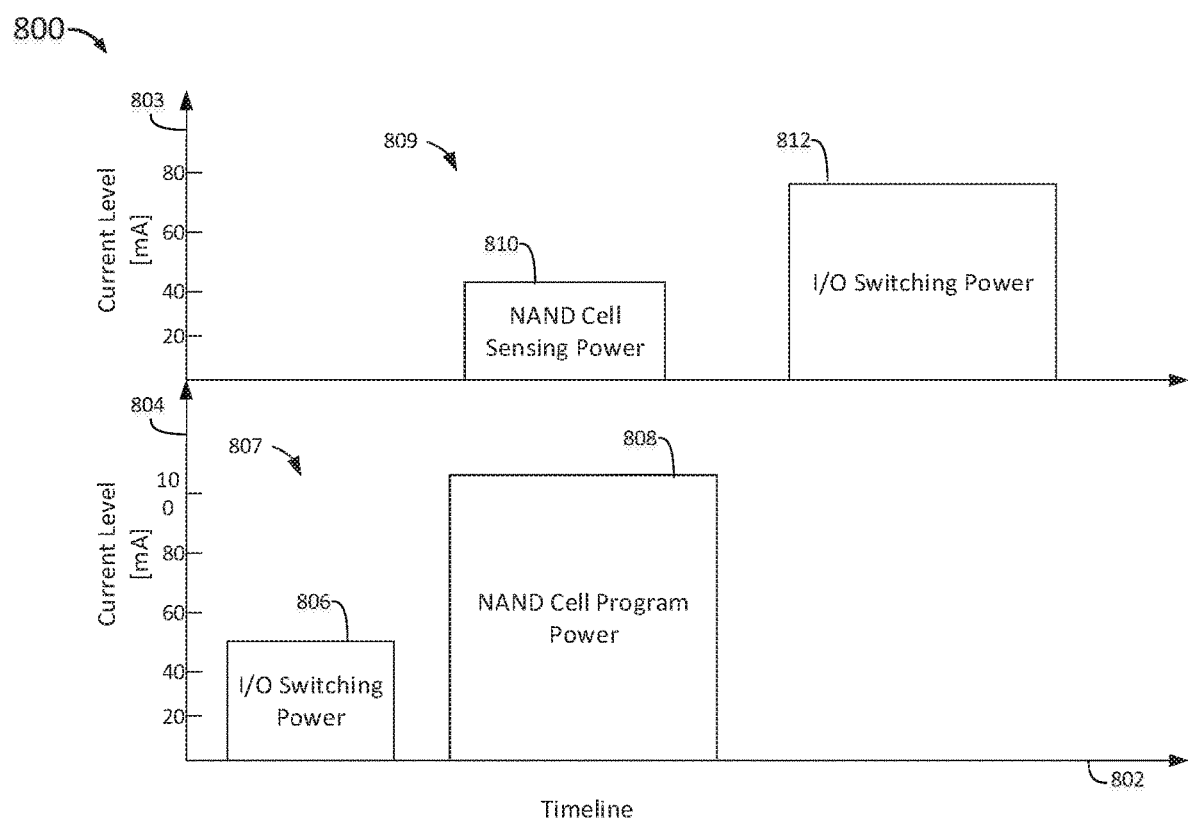
FIG. 8 shows a plot of a simple current modelling based on NAND flash operation phases for the scheduling of a program command interleaved with a read command.

FIG. 8 shows a plot 800 of a simple current modelling based on NAND flash operation phases for the scheduling of a program command interleaved with a read command. The plot 800 includes an x-axis 802 representing a progression of the command in time, a first y-axis 804 representing the current in mA, and a second y-axis 803 also representing the current in mA. The timeline represented on the x-axis 802 is not to the same scale in time as the timelines presented in FIGS. 4-7. The plot 800 illustrates a program command 807 and a read command 809 interleaved such that a portion of the program command is executed simultaneously with a portion of the read command.

The program command 807 includes a first phase 806 which uses a simplified current during an I/O switching phase of the command, and a second phase 808 which uses another simplified current during the NAND cell program phase of the command. The energy consumption value of the first phase of the program command 806 is proportional to the current level expended multiplied by the time during which the first phase 806 is executed. Likewise, the energy consumption value of the second phase 808 of the program command is proportional to the current level expended multiplied by the time during which the second phase 808 is executed.

The read command 809, shown with a current level indicated on second y-axis 803 and on the same timeline as the program command 807, includes a first phase 810 which uses a simplified current during a NAND cell sensing phase and a second phase 812 which uses a simplified current during an I/O switching phase of the command.

The controller may compare the energy consumption of each of the phases of the program command 807 and read command 809 to the present power budget to determine whether the commands can be granted. Because the program command 807 and the read command 809 are partitioned into multiple phases based on the simplified current consumed during the phase of the command, the controller is able to schedule phases of the commands to be executed simultaneously within the present power budget. However, if the commands were not partitioned into phases, these commands may have a cumulative energy consumption that exceeds the present power budget and the commands could not be executed in parallel. Instead, the read command 809 would have to be transmitted and executed following the completion of the program command 807.

The controller determines that the energy consumption of the first phase of the read command 810 and the second phase of the program command 808 are within the present power budget, and the two command phases can be executed in parallel such that the phases overlap. The combined energy consumption of the first phase of the read command 810 and the second phase of the program command 808 do not exceed the present power budget at any time during the period of execution of the two command phases, and the commands can be interleaved without exceeding the present power budget.

The interleaving and scheduling of commands in this way efficiently uses the power budget at a given time without exceeding the present power budget. The interleaving and scheduling can be performed within the hardware by accurately timing the instants at which each of the commands is transmitted, which is not possible in a software-based power throttling scheme.

Figure 9:
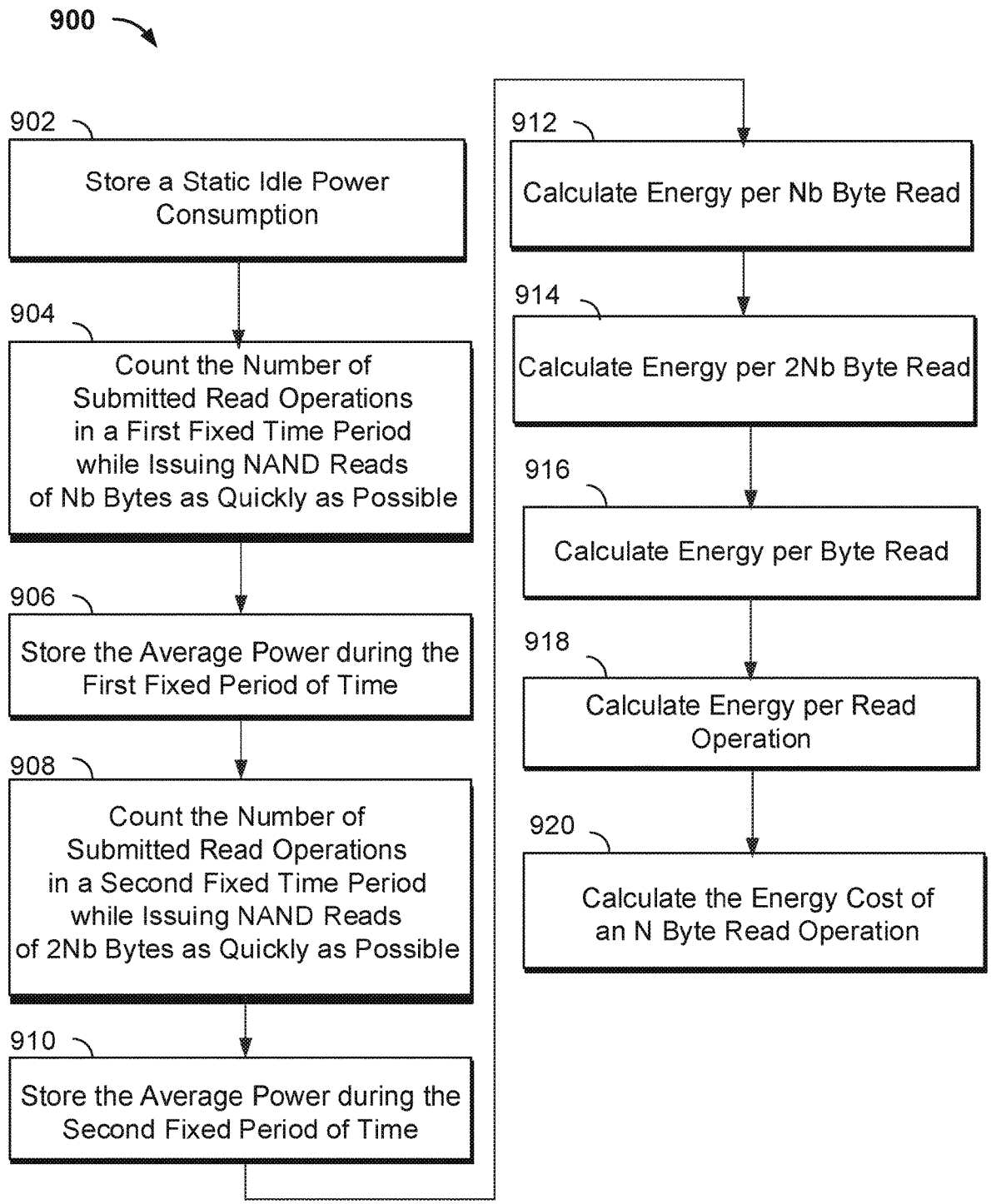
FIG. 9 shows a flow chart that illustrates a process for calibrating a system using actual power measurements of operations.

Periodically, the measured energy consumption of the executed commands are reconciled with the estimated energy consumption costs of the commands (such as those shown in FIGS. 4-8), and the costs recorded in the register can be dynamically tuned. At start-up an initial estimation of the current usage, and associated energy usage, is calculated for each command type by a calibration procedure. FIG. 9 shows a flow chart 900 that illustrates a process for calibrating a system using the actual current measurements of operations. Calibration of the system provides accurate initial figures for the basic overhead energy cost of the operation and the cost per byte transferred of the operation for each command. This procedure is similar for both write operations and program operations.

In step 902, the average power (Ps) on the main SSD supply with no NAND operations in progress is stored to obtain a static idle power consumption. This measurement gives a base-level power consumption when the SSD is on and operational, but is not executing any commands. In step 904, the controller issues NAND reads of Nb bytes each as fast as possible over a fixed period of time Tr1 seconds, counting the number of read operations submitted as Nr1. In step 906, the average power (Pr1) on the main SSD power supply rail during period Tr1 is stored. In step 908, the controller issues NAND reads of 2 Nb bytes each as fast as possible over a fixed period of time Tr2 seconds, counting the number of read operations submitted as Nr2. In step 910, the average power (Pr2) on the main SSD power supply rail during the period Tr2 is stored.

In step 912, the energy in Joules used per Nb byte read is calculated according to the equation $Er1=((Pr1-Ps)*Tr1)/Nr1$. In step 914, the energy in Joules used per 2 Nb byte read is calculated according to the equation $Er2=((Pr2-Ps)*Tr2)/Nr2$. In step 916, the energy used per byte read is calculated from these values, according to the equation $Erb=(Er2-Er1)/Nb$. In step 918, the energy used per read operation is calculated according to the equation $Er0=(Er1-((Er2-Er1))$. Finally, in step 920, the cost of an N byte read operation in Joules can be calculated according to the equation $Cr=Er0+(Erb*N)$.

The calculated cost of an N byte read operation is then stored in the hardware register to be used in the estimation of energy consumption for commands during the operation of the SSD. The calculated cost of an N byte program or write operation can be calculated using the same method upon initialization of the SSD for use in the estimation of energy consumption.

In some implementations, the method described in FIG. 6 is initiated upon initialization of the SSD device at startup. In some implementations, the method described in FIG. 9 can be initiated by the host at various points in time.

Figure 10:
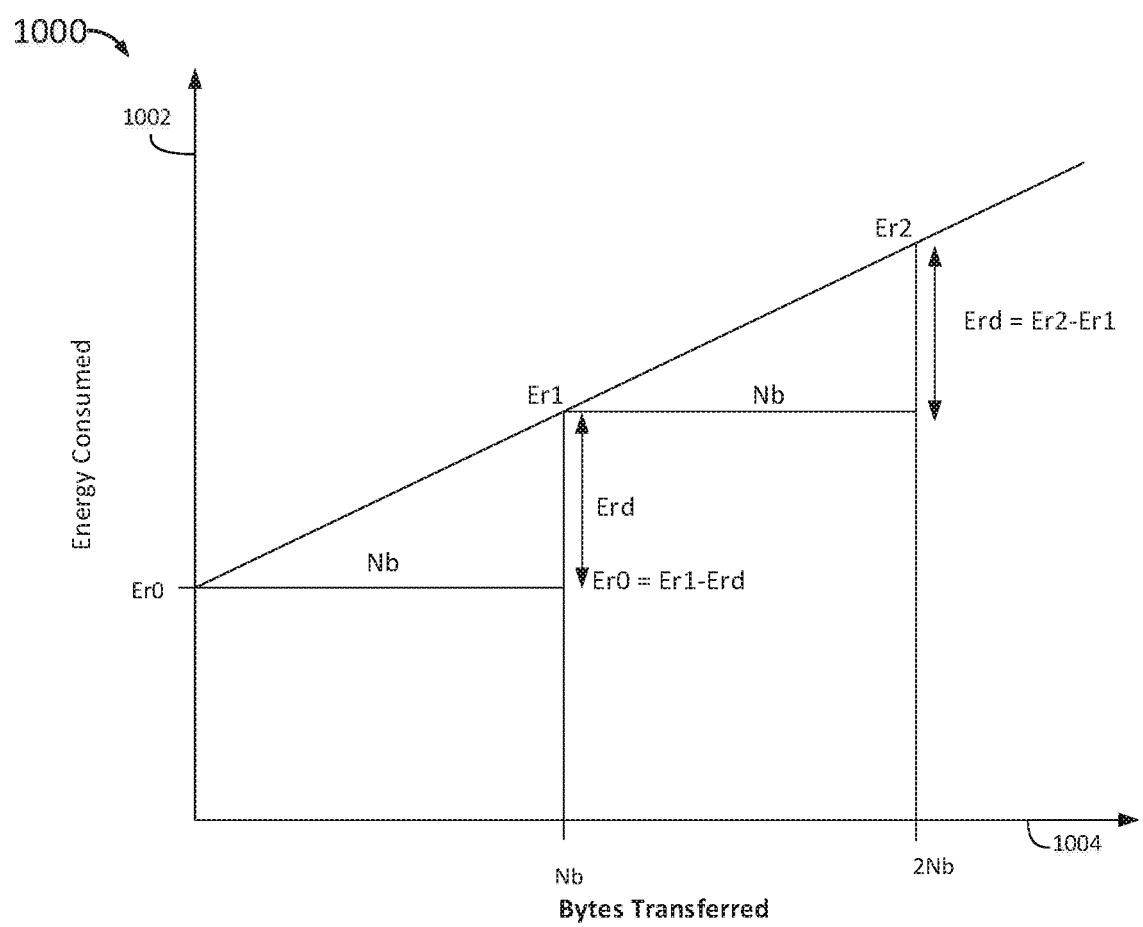
FIG. 10 shows a plot illustrating the calculation of operation energy according to an embodiment.

FIG. 10 shows a plot 1000 illustrating the calculation of operation energy, as described in regard to FIG. 9. The plot 1000 includes an x-axis 1002 representing bytes of NAND read operations transferred across the channel to the NAND dies during the calibration procedure and a y-axis 1004 representing the energy consumed in Joules by the execution of the NAND reads. After Nb bytes of read operations are transmitted, a power consumption value of Er1 Joules is recorded, as described in step 912 of FIG. 9. After Nb bytes of read operations are transmitted, a power consumption value of Er2 Joules is recorded, as described in step 914 of FIG. 9. A difference between the values of Er1 and Er2 can be calculated in Joules, shown in FIG. 10 as Erd, where Erd=Er2−Er1. The energy in Joules used per read operation (Er0) can be calculated by a controller by subtracting Erd from Er1, according to the equation Er0=Er1−Erd, or Er0=Er1−(Er2−Er1), as described in step 918 of FIG. 9. As shown in the plot 1000, the energy cost of an operation is assumed to include a basic operational cost (Er0) plus a component that varies linearly in proportion to the number of bytes transferred.

Figure 11:
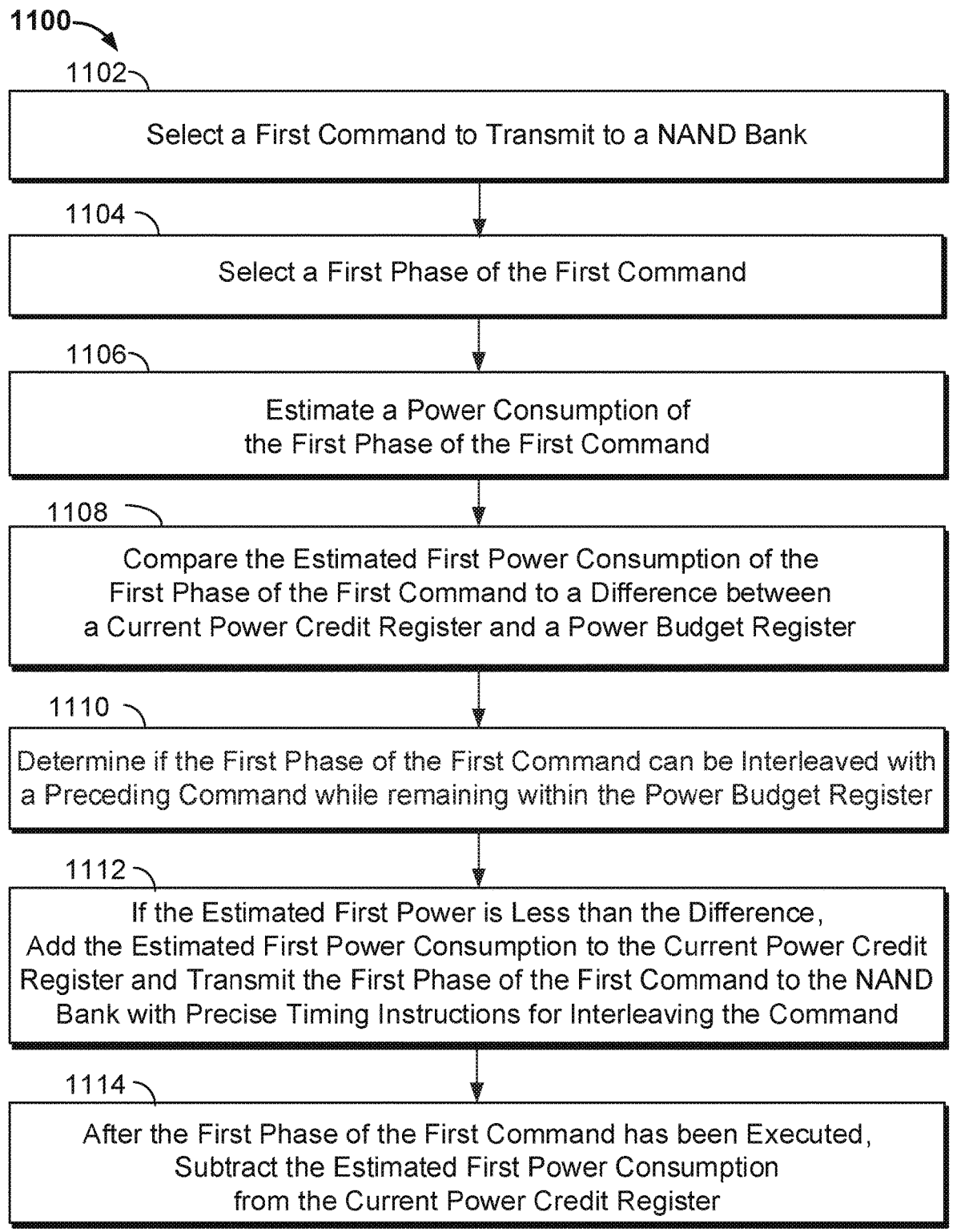
FIG. 11 shows a flow chart of a process for scheduling commands using a hardware support logic to manage power consumption.

FIG. 11 shows a flow chart 1100 that illustrates a process for scheduling commands using a hardware support logic to manage power consumption. At step 1102, a first command to be transmitted to a NAND bank is selected. The first command to be transmitted to a NAND bank is selected by a hardware instantiated logic block in a bank scheduling controller (for example, first bank command scheduler 104 or second bank command scheduler 108 in FIG. 1) according to a scheduling algorithm. The first command to be transmitted may be one of a read, write, or erase command. At step 1104, a first phase of the first command is selected. Read and write commands can be partitioned into an I/O switching phase and a cell program phase, each of which has a different associated current profile and energy consumption. In order to better estimate the energy consumption associated with a command or operation, the command is broken down into phases when possible. Each phase of the command has a different estimated energy consumption and can be used by the power budget controller to time the scheduling of commands to minimize the energy consumption of commands when executed in parallel combination.

At step 1106, the energy consumption value of the first phase of the first command is estimated. The energy consumption value is estimated based on stored estimates of the energy consumption per byte of the various operation types. The bank command scheduler may access a hardware register to obtain the appropriate information to estimate the power consumption value for the first phase of the command. The estimate is then transmitted to a power budget controller (such as power budget controller 105 in FIG. 1).

At step 1108, the estimated first power consumption value of the first phase of the first command is compared to a difference between a present power credit register value and power budget register value (for example, the values of credit register 109 and budget register 111 in FIG. 1). The comparison is conducted at the power budget controller, and the power budget controller determines if there is sufficient power available within the power budget to allow the first phase of the first command to be transmitted and executed. The power credit register may be a register in which the estimated power consumption of all currently executing commands is registered to give the present power consumption in the SSD. The power budget register may be a register in which the present power budget is stored. The power budget is expressed in units of Joules per second available for the execution of operations on the SSD.

At step 1110, the power budget controller determines, based on the present power credit register value and a schedule of already transmitted commands, whether the first phase of the first command can be transmitted in parallel with a phase of an already approved command. The power budget controller may transmit to the bank scheduler a precise timing of commands such that the command phases are interleaved. In this way, any peaks in current of the phases do not coincide and reinforce and the energy consumption of the commands is within the present power budget.

At step 1112, if the estimated first power is less than the difference between the power credit register value and the power budget register value, the estimated first power consumption value is added to the present power credit register value, and the first phase of the first command is transmitted to the NAND bank. The power budget controller may also send instructions regarding the precise timing of the transmission of the first phase of the command in order to interleave the command with preceding commands being executed without exceeding the present power budget. This step may also include receiving at the bank command scheduler an indicator granting the requested power consumption for the transmission and execution of the command.

At step 1114, after the first phase of the first command has been executed, the first estimated power consumption value is subtracted from the present power credit register value. This step may be conducted by the power budget controller in response to receiving an indication that the command has been executed. Subtracting the estimated first power consumption value from the present power credit register value adjusts the power credit register value to show that additional power is now available for the execution of other commands.

These steps are executed in hardware based logic blocks in the bank command schedulers on a per channel basis, and in hardware based logic blocks forming the power budget controller. Employing a power budget controlling scheme based in hardware-enables the efficient scheduling of commands and use of SSD device power resources. The estimations of the energy consumption per command can be easily updated periodically in order to provide a more accurate estimation to allow the power budget controller to allocate resources. Further, the partitioning of commands into multiple phases, such as an I/O switching phase and a cell sensing or program phase, depending on the energy consumption profile of the command gives the power budget controller a more fine-grained ability to allocate power resources and efficiently transmit commands to the NAND banks. The hardware-based controller can more efficiently manage power consumption on the SSD device than a software-based system.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A memory system comprising:
a memory controller having:
a bank command scheduler implemented in a hardware logic block, and
a power budget controller including a budget register and a credit register;
a memory bank having an I/O bus; and
a channel connecting the I/O bus to the memory controller, the channel configured to transmit data between the memory bank and the memory controller and to transmit a command from the memory controller to the memory bank,
wherein the hardware logic block is configured to:
determine a first command in a queue to be transmitted to the memory bank;
estimate a first power consumption value for the first command;
query the power budget controller to determine if the first power consumption value satisfies a threshold;
if the first power consumption value satisfies the threshold:
transmit the first command to the memory bank over the channel; and
transmit a signal to the power budget controller indicating that the first command has been executed; and
if the first power consumption value does not satisfy the threshold:
begin a timer associated with an idle time of the first command;
determine a second command in the queue to be transmitted to the memory bank prior to the first command; and
when the timed idle time of the first command exceeds an idle time threshold, assign a priority status to the first command, the priority status stopping granting permission to other commands to be transmitted until the first power consumption value satisfies the threshold.

2. The memory system of claim 1, wherein by querying the power budget controller to determine if the first power consumption value satisfies a threshold comprises comparing the first power consumption value to a difference between the credit register and the budget register.

3. The memory system of claim 1, wherein if the first power consumption value does not satisfy the threshold, the hardware logic block is configured to:
estimate a second power consumption value for the second command;
query the power budget controller to determine if the second power consumption value satisfies the threshold; and
if the second power consumption value satisfies the threshold:
transmit the second command to the memory bank over the channel prior to the first command.

4. The memory system of claim 1, wherein if the first power consumption value does not satisfy the threshold, the hardware logic block is configured to wait until the first power consumption value satisfies the threshold.

5. The memory system of claim 1, wherein the first command comprises a first phase and a second phase, and wherein the hardware logic block is configured to:
estimate a third power consumption value for the first phase;
query the power budget controller to determine if the third power consumption value for the first phase satisfies the threshold; and
transmit the first phase to the memory bank over the channel.

6. The memory system of claim 5, wherein the first command is a read command, the first phase is a cell sensing phase, and the second phase is an I/O switching phase.

7. The memory system of claim 5, wherein the first command is a program command, the first phase is an I/O switching phase, and the second phase is a cell program phase.

8. The memory system of claim 1, wherein the hardware logic block is configured to estimate a first power consumption value for the first command by accessing a register of estimated power consumption values for a given command.

9. The memory system of claim 1, wherein the hardware logic block is further configured to:
monitor an actual power over an I/O power rail and a cell power rail; and
transmit, to the power budget controller, a measured actual power over the I/O power rail and the cell power rail.

10. The memory system of claim 1, wherein the power budget controller is configured to:
receive, from the hardware logic block, a first power consumption value;
compare the first power consumption value to a difference between the values stored in the power budget register and the credit register;
add the first power consumption value to the credit register;
transmit a grant response if the first power consumption value is less than the difference;
receive a status from the hardware logic block indicating that the first command has been executed; and
remove the first power consumption value from the credit register.

11. The memory system of claim 10, wherein the power budget controller is further configured to determine if there is a priority command before adding the first power consumption value to the credit register and transmitting the grant response.

12. The memory system of claim 10, wherein the power budget controller is further configured to
determine if a first phase of the first command can be transmitted in parallel with a previously transmitted command and have a combined power consumption value that satisfies a threshold; and
provide timing instructions to the hardware logic block for interleaving a first phase of the first command with the preceding command being executed.

13. The memory system of claim 1, wherein the priority status further establishes execution of the first command after execution of a currently pending command.

14. A method of transmitting commands based on a power consumption budget, the method comprising:
selecting, by a hardware logic block, a first command to send to a NAND bank over a channel;
selecting a first phase of the first command;
estimating a first power consumption value of the first phase;

comparing, at a power budget controller, the estimated first power consumption value to a difference between a value of a present power credit register and a value of a power budget register;
if the estimated first power consumption value is less than the difference:
adding the estimated first power consumption value to the value of the present power credit register;
transmitting the first phase of the first command to the NAND bank over the channel;
subtracting, after the first phase of the first command has executed, the estimated first power consumption value from the value of the present power credit register; and
if the estimated first power consumption value is more than, or equal to, the difference:
beginning a timer associated with an idle time of the first phase of the first command;
selecting a second command to send to the NAND bank over the channel prior to the first command; and
when the timed idle time exceeds an idle time threshold, assigning a priority status to the first phase of the first command, the priority status stopping granting permission to other commands to be transmitted until the first power consumption value is less than the difference.

15. The method of claim 14, the method further comprising:
selecting a second phase of the first command;
estimating a second power consumption value of the second phase;
comparing, at a power budget controller, the estimated second power consumption value to a difference between a current value of the power credit register and the value of the power budget register;
if the estimated second power consumption value is less than the difference:
adding the estimated second power consumption value to the current value of the power credit register;
transmitting the second phase of the first command to the NAND bank over the channel; and
subtracting, after the second phase of the first command has executed, the estimated second power consumption value from the current value of the power credit register.

16. The method of claim 14, the method further comprising:
selecting a second phase of the first command;
estimating a second power consumption value of the second phase;
comparing, at a power budget controller, the estimated second power consumption value to a difference between a current value of the power credit register and the value of the power budget register;
if the estimated second power consumption value is greater than the difference:
beginning a wait counter for the second phase of the first command; and
labeling the second phase of the first command as a priority command.

17. The method of claim 16, the method further comprising:
waiting until the estimated second power consumption value is greater than a newly compared difference between the values stored in the power credit register and the power budget register; and
adding the estimated second power consumption value to the present power credit register;
transmitting the second phase of the first command to the NAND bank over the channel; and
subtracting, after the second phase of the first command has executed, the estimated second power consumption value from the value stored in the power credit register.

18. The method of claim 14, wherein estimating a first power consumption value of the first phase comprises determining an estimated power consumption of an I/O switching command.

19. The method of claim 14, wherein estimating a first power consumption value of the first phase comprises determining an estimated power consumption of a cell sensing command.

20. The method of claim 14, the method further comprising:
determining that the second command does not have more than one phase;
estimating a third power consumption value of the second command;
comparing, at a power budget controller, the estimated third power consumption value to a difference between the current value of the power credit register including the added first power consumption value and the value of the power budget register; and
transmitting the second command to the NAND bank over the channel.

21. The method of claim 14, wherein the priority status further establishes execution of the first phase of the first command after execution of currently pending command.

* * * * *